United States Patent [19]

Yagi et al.

[11] Patent Number: 4,813,782
[45] Date of Patent: Mar. 21, 1989

[54] METHOD AND APPARATUS FOR MEASURING THE FLOATING AMOUNT OF THE MAGNETIC HEAD

[75] Inventors: Shigeaki Yagi; Hirofumi Furusawa, both of Nagaoka, Japan

[73] Assignee: Alps Electric Co., Ltd., Japan

[21] Appl. No.: 20,080

[22] Filed: Feb. 27, 1987

[30] Foreign Application Priority Data

Jul. 16, 1986 [JP] Japan .................. 61-167650

[51] Int. Cl.$^4$ .............................................. G01B 9/02
[52] U.S. Cl. ..................................... 356/357; 356/359
[58] Field of Search ......................... 356/357, 359, 363

[56] References Cited

U.S. PATENT DOCUMENTS 4,593,368  6/1986  Fridge et al. .................. 356/357 X
4,627,733 12/1986  Wada ................................ 356/359

Primary Examiner—Davis L. Willis
Assistant Examiner—Matthew W. Koren
Attorney, Agent, or Firm—Guy W. Shoup; Paul J. Winters; Stephen L. Malaska

[57] ABSTRACT

An apparatus for measuring the floating amount of the magnetic head comprising a single color light source such as laser, a rotating glass disk, a light scanner section, a photoelectric converter element, and an interference light strength computing section (or waveform memory section and computer section). Therefore, static behaviors such as pitch angle and balance of the magnetic head can be measured along with dynamic behaviors such as floating and frequency fluctuations thereof. Even when the floating amount of the magnetic head is extremely low, the measurement can be made accurately in a shorter time period with a high S/N ratio.

2 Claims, 3 Drawing Sheets

METHOD AND APPARATUS FOR MEASURING THE FLOATING AMOUNT OF THE MAGNETIC HEAD

BACKGROUND OF THE INVENTION (a) Field of the Invention

The present invention relates to a method and an apparatus capable of easily and accurately measuring the floating amount or static behaviors of floating motion such as pitch angle and balance as well as dynamic behaviors such as floating and frequency fluctuations of the magnetic head, particularly of the gimbal type which is intended to use with the magnetic disk, which can excellently follow up the movement of the magnetic disk, and which is allowed to have small head pressure. The present invention also relates to a method and an apparatus for enabling these measurements to be achieved even when the floating amount of the magnetic head is extremely low.

(b) Prior Art

The floating amount of the magnetic head was conventionally measured relating to mainly its floating motion or static behaviors such as pitch angle and balance wherein white light was used as the light source and color phase changes in interference fringes caused in a space between the rotating glass disk and that face of the magnetic head which was opposite to the glass disk were discriminated by eyes or wherein a single color light was used and calculation was made on the basis of the strength of interference fringes on that face of the magnetic head which was opposite to the glass disk.

A typical example of these conventional techniques will be described referring to FIG. 1. FIG. 1 is a block diagram showing one of the conventional measuring apparatuses. In FIG. 1, numeral 1 represents a magnetic head supported by a gimbal 2. Numeral 3 denotes a monochromatic light source and monochromatic beam emitted from this laser light source 3 is reflected by a beam splitter 4 in a direction substantially perpendicular to the monochromatic beam incident upon the beam splitter 4. Passing through a glass disk 5 which is horizontally rotated between the beam splitter 4 and the magnetic head 1, the monochromatic beam reflected by the beam splitter 4 is cast to an optional point on that face of the magnetic head 1 which is opposite to the glass disk 5. The glass disk 5 is made of quartz which is stable in optical property, and numeral 6 represents a drive motor for driving the glass disk 5.

When the monochromatic beam is cast like this onto that face of the magnetic head 1 which is opposite to the glass disk 5, passing through the glass disk 5, interference fringes are generated in a space between the glass disk 5 and that face of the magnetic head 1 which faces the glass disk 5. The interference fringes are photoelectrically converted by a photoelectric converter element 7 such as the photosensor and calculated by a computer section 9 through an A/D converter section 8, so that the floating amount of the magnetic head at the one optional point can be measured along with floating fluctuations caused by vibration and the like. In FIG. 1, numeral 21 denotes a beam expander, 22 an objective and 23 an imaging lens.

In the conventional case as described above and shown in FIG. 1, however, the measurement of pitch angle and balance of the magnetic head made it necessary to drive the whole of the optical system and move the monochromatic beam spot. This was a troublesome operation and it was also difficult to move the monochromatic beam spot at high speed. In the case where the measurement was made, using white light and seeing color phase changes in interference fringes, the floating amount which was extremely low or less than the visible light could not be measured.

SUMMARY OF THE INVENTION

The present invention is therefore intended to eliminate the above-mentioned drawbacks and the object of the present invention is to provide a method and an apparatus for enabling static behaviors such as pitch angle and balance of the magnetic head, which is floated extremely low, to be measured along with dynamic behaviors such as floating and frequency fluctuations thereof, and also enabling the measurement to be made shorter in time and more accurate with a high S/N ratio.

The object of the present invention can be achieved by a method for measuring the floating amount of the magnetic head comprising scanning that face of the magnetic head, which is opposite to a rotating glass disk, by means of a single color laser beam passing through the glass disk, and detecting the light strength distribution of interference fringes caused in a space between the glass disk and that face of the magnetic head, which is opposite to the glass disk, by means of a photoelectric converter element; and by an apparatus for measuring the floating amount of the magnetic head comprising a single color laser, a rotating glass disk, a light scanner section, a photoelectric converter element and an interference fringe light strength measuring section (or waveform memory section and arithmetic unit section).

According to the present invention as described above, the floating amount of the magnetic head is measured by scanning that face of the magnetic head which is opposite to the glass disk by means of a single color light to measure the light strength distribution of interference fringes. Therefore, static behaviors such as pitch angle and balance of the magnetic head can be measured along with dynamic behaviors such as floating and frequency fluctuations thereof. Even when the floating amount of the magnetic head is extremely low, the measurement can be made accurately in a shorter time period with a high S/N ratio.

DETAILED DESCRIPTION OF THE PREFERRED EMBODIMENT

Figures 3A, 3B:
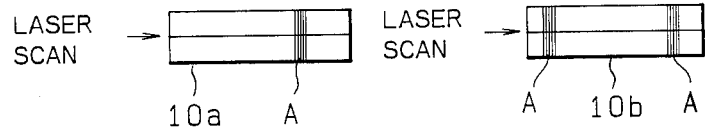
FIGS. 3A and 3B are plans showing distributions of interference fringes which correspond to those in FIG. 2.
Figure 4:
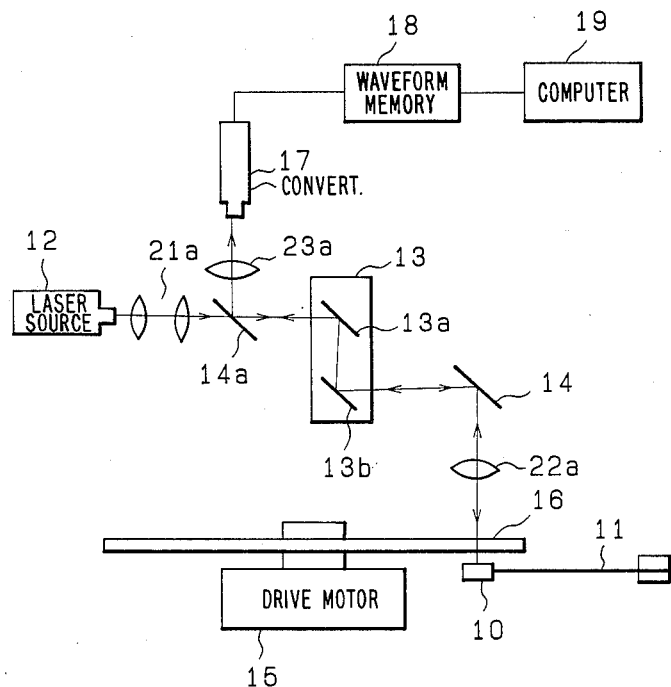
FIG. 4 is a block diagram showing one of the examples of the device according to the present invention.

An embodiment of the present invention will be described in detail with reference to FIGS. 4 through 3. FIG. 4 is a block diagram showing an embodiment of the present invention, in which numeral 10 represents a magnetic head supported by a gimbal 11. Numeral 12 denotes a laser light source and laser beam emitted from this laser light source 12 is made incident upon a light scanner section 13. Although various kinds of laser beam scanning systems have been known, this embodiment employs the system of rotating and vibrating two sheets of mirrors 13a and 13b around coordinate axes crossed perpendicular to each other. The laser beam which has passed the light scanner section 13 is reflected at substantially right angle by means of a beam splitter 14 and, passing through a quartz glass disk 16 which is horizontally rotated by a drive motor 15 and between the beam splitter 14 and the magnetic head 10, the laser beam is cast scanning that face of the magnetic head 10 which is opposite to the glass disk 16. When that face of the magnetic head 10 which is opposite to the glass disk 16 is scanned like this by the laser beam, interference is caused in a space between the glass disk 16 and that face of the magnetic head 10 which faces the glass disk 16, and interference fringes A are formed on that face of the magnetic head 10 which is opposite to the glass disk 16. These interference fringes are returned back through the beam-guided passage, reflected by a beam splitter 14a, detected by a photoelectric converter element 17 such as the photosensor, and passed through a waveform memory section 18, so that their strength distribution can be measured by a computer section 19. In FIG. 4, numeral 21a represents a beam expander, 22a an objective, and 23a an imaging lens.

Figure 1:
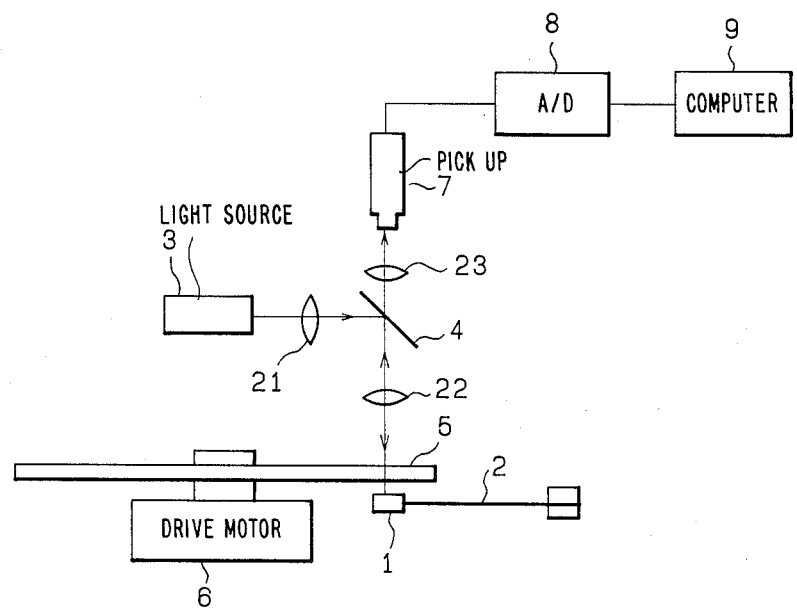
FIG. 1 is a block diagram showing an example of a conventional device for measuring the floating amount of a magnetic head.
Figure 2:
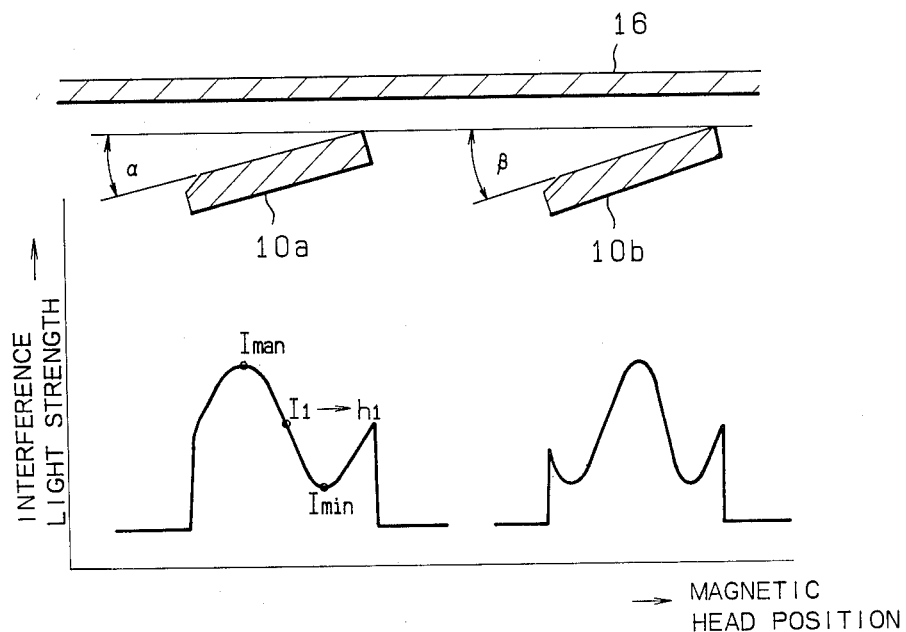
FIG. 2 is a graph showing light strengths of interference fringes.

When the laser beam scans that face of the magnetic head 10 which is opposite to the glass disk 16, its interference light strengths can be spotted to draw a curve similar to the sine wave, as shown in FIG. 2. The curve becomes different, depending upon the magnetic head 10a slanted at an angle of α and the magnetic head 10b slanted at an angle of β, as shown in FIG. 2, for example. And the distribution of interference fringes A also becomes different, as shown in FIGS. 3A and 3B which correspond to the curves in FIG. 2, respectively. This is because the curve becomes more dense or higher in frequency as the magnetic head is slanted more sharply. More specifically, this is because the peak or bottom of the curve is formed at a point of 4/λ. The relationship between the light strength and the floating amount can be expressed by the following equation (1) and any optional floating amount of the magnetic head can be calculated by deriving light strengths at the peak and bottom of the curve from the equation (1).

$$I = r + s - 2\sqrt{rs}\,\cos(4\pi h_1/\lambda_1)/1 + rs - 2\sqrt{rs}\,\cos(4\pi h_1/\lambda_1) \quad (1)$$

$$I_{max} = r + s + 2\sqrt{rs}\,/1 + rs + 2\sqrt{rs},$$

$$I_{min} = r + s - 2\sqrt{rs}\,/1 + rs - 2\sqrt{rs}$$

wherein r represents the reflection ratio of the glass disk, s the reflection ratio of the slider (or head), $\lambda_1$ laser wavelength, $I_1$ light detector output (or light strength) and $h_1$ floating amount.

Although the light scanner section 13 has comprised two sheets of mirrors vibrated in the case of the above-described embodiment, it is not limited to this but it may have any other construction. Further, scanning may be carried out by driving the optical system in the common floating amount measuring apparatus if high speed can be neglected.

According to the present invention as described above, measurement is carried out by scanning that face of the magnetic head which is opposite to the glass disk by means of a single color laser beam and detecting the strength distribution of interference light. Even when the floating amount of the magnetic head is extremely low, therefore, static behaviors such as pitch angle and balance can be measured with high accuracy along with dynamic behaviors such as floating and frequency fluctuations and the measuring time can also be made much shorter with a high S/N ratio, as compared with the conventional case where spot measurement was carried out.

We claim:

1. In a method for measuring the floating amount spacing of a magnetic head from the surface of a rotating glass disk by passing a light beam through the glass disk to be reflected on a surface of the magnetic head so as to create an interference pattern corresponding to the floating amount spacing, and detecting the interference pattern and deriving the floating amount spacing therefrom, the improvement comprising:

using a laser light source to provide a laser light beam of a single wavelength to irradiate the surface of the magnetic head; scanning said laser beam over said surface of said magnetic head;

measuring a distribution of light strength of the interference pattern fringes across the surface of the magnetic head; and deriving the floating amount spacing of the magnetic head from the glass disk on the basis of a given reflection ratio of the glass disk, a given reflection ratio of the magnetic head surface, the laser light wavelength, and the measured light strength distribution.

2. In an apparatus for measuring the floating amount spacing of a magnetic head from the surface of a rotating glass disk, having a light beam source for providing a light beam, means for directing the light beam to and through the glass disk to be reflected on a surface of the magnetic head so as to create an interference pattern corresponding to the floating amount spacing between the glass disk and the magnetic head, and detecting means for detecting the interference pattern reflected from the glass disk and the magnetic head and deriving the floating amount spacing therefrom, the improvement comprising:

a laser light source as said light beam source to provide a laser light beam of a single wavelength to irradiate the surface of the magnetic head;

a means for scanning said laser light beam over said surface of said magnetic head;

said detecting means being comprised of light strength distribution measuring means, including a photoelectric converter, waveform memory section, and computer, for measuring a distribution of light strength of the interference pattern fringes across the surface of the magnetic head and deriving the floating amount spacing of the magnetic head from the glass disk on the basis of a given reflection ratio of the glass disk, a given reflection ratio of the magnetic head surface, the laser light wavelength, and the measured light strength distribution.

* * * * *